United States Patent Office 3,219,393
Patented Nov. 23, 1965

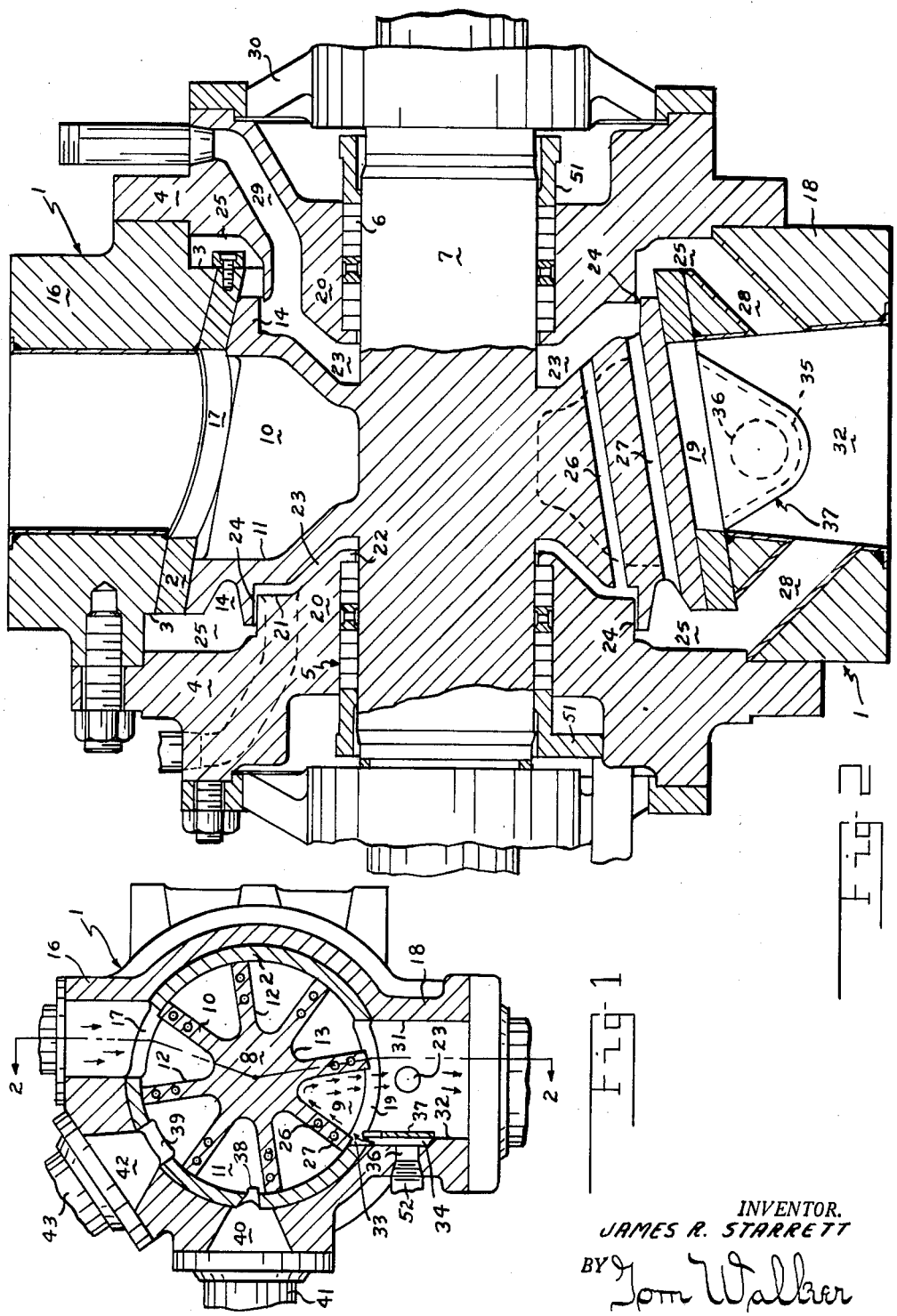

---

3,219,393
ROTARY VALVE
James R. Starrett, Springfield, Ohio, assignor to The Bauer Bros. Co., Springfield, Ohio, a corporation of Ohio
Filed Oct. 5, 1961, Ser. No. 143,187
17 Claims. (Cl. 302—49)

This invention relates to rotary valves and more particularly to improvements in material handling valves. Embodiments are particularly advantageous for use in feeding wood chips, including fine fluffy substance such as sawdust, to a pressurized vessel and the invention will be described with reference thereto. However neither its form nor application is intended to be limited thereby.

Material handling valves are quite vital in the pulp refining industry. For example, pressurized cooking vessels, such as digesters, require input and discharge valves capable of not only maintaining a seal but also of providing an effective and efficient transmission of materials being worked. Such valves are normally of a rotary type, operate under heavy loads and produce many problems in their use. They are conventionally subject to unbalance, substantial wear, require a good deal of maintenance and generally develop a relatively low operating efficiency.

The present invention overcomes many of the problems evidenced in the use of prior art material handling valves. Moreover, it produces a novel rotary valve unit the advantages of which are particularly obvious when it is used in pulp refining systems. For example, the prior art rotary valve directed to such use has structure which in operation produces a flow path that inherently subjects its rotor portion to an unbalanced load. This results in wear of the rotor and its housing, particularly at the inlet and discharge openings, and consequent serious leakage of materials being processed. These materials attack packing and bearing elements and eventually produce breaks in the sealed system essential to digester phases of the refining process. The present invention novelty provides a relative offset of the inlet and discharge openings in rotary valves and a novel purge system so related to their rotors as to maintain an environment for their operation which substantially eliminates unbalance and provides an optimum disposition of leakage materials. Further, the conventional material handling valve has difficulty in handling light fluffy material and tends to operate at substantially less than full capacity. The present invention provides an additional purge system which avoids such difficulties. In addition, the invention, among other features, provides highly advantageous vent and temperature control which lends a material handling valve optimum operating efficiency at minimum operating cost.

A primary object of the invention is to provide improvements in material handling valves rendering them economical to fabricate, more efficient and satisfactory in use, adaptable to a wide variety of applications and low in operating cost.

A further object of the invention is to provide a material handling valve particularly advantageous for use with a vessel operating under elevated pressure and temperature.

Another object of the invention is to provide a novel rotary valve unit wherein the input and discharge openings are relatively offset in a manner to avoid producing an unbalance of its rotor and undue wear of its components consequent to delivery of material therethrough.

An additional object of the invention is to provide a material handling valve unit having novel and more effective means for disposing of leakage material.

Another object of the invention is to provide a material handling valve having a novel purge feature which provides it with more positive, more effective and more efficient delivery characteristics.

A further object of the invention is to provide a novel rotary valve having improved vent features.

Another object of the invention is to provide improvements in rotary valves enabling the rotors thereof to be maintained at substantially uniform temperature throughout their expanse.

An additional object of the invention is to provide a novel rotary valve unit having a staged venting action enabling its continuous operation at substantially maximum capacity.

Another object of the invention is to provide a material handling valve particularly advantageous for use with vessels operating under conditions of elevated pressure having an improved structure producing a flow pattern to substantially eliminate the occurrence of rotor unbalance and undue wear of its operating components, enabling it to effectively seal such vessels in operation.

A further object of the invention is to provide a novel rotary type material handling valve capable of effectively transmitting light fluffy materials and materials which tend to adhere thereto.

An additional object of the invention is to provide more efficient and more durable material handling valve unit.

A further object of the invention is to provide a rotary valve possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, the mode of operation as hereinafter described or illustrated in the accompanying drawings or their equivalents.

Referring to the accompanying drawing wherein is shown one but obviously not necessarily the only form of embodiment of the invention, FIG. 1 is a transverse sectional view of a rotary valve unit in accordance with the invention; and FIG. 2 is a view taken on line 2—2 of FIG. 1.

Like parts are indicated by similar characters of reference throughout the several views.

Referring to the drawing there is a valve body 1 open to either end to an interior having a frusto conical configuration defined by a liner 2. The liner extends between shoulders 3 formed by internal expansion of the body 1 at its respective ends. Fixed over each end of the body 1 is a generally annular plate 4 defining a central aperture 5. The apertures 5 are oriented coaxial with the opening through the body 1. Packing elements 6 line the respective apertures 5 and form pressure seals for a rotor shaft 7 which extends therethrough. Journaled in the bore defined by the liner 2 is a rotor 8 keyed for rotation with the shaft 7.

The rotor 8 has a generally frustro-conical configuration and circumferentially spaced pockets 9 laterally defined by equidistantly spaced radial wall sections or vanes 10. The vanes 10 extend between respective end walls 11 which define the longitudinal extremities of the pockets 9 and the rotor 8. The walls 11 are dished inwardly towards each other at their root portions about the shaft 7. Thus, the pockets 9 are respectively defined by the endwalls 11 and wall surfaces 12 which converge inwardly to the rotor shaft, adjacent which they are joined and terminated by arcuate bottom surfaces 13. Cast integral with the outer peripheral portions of the respective end walls 11 of the rotor and generally perpendicular thereto are ring elements 14. The rings 14 project outwardly in an axial sense and provide additional bearing engagement with the liner 2 of the body 1.

A tubular projection 16 at the top of the body 1 defines an input channel to the rotor 8 through an opening 17 in the liner 2. This opening is centered intermediately of the ring elements 14 but offset to one side of the longitudinally extending central vertical plane of the valve body advanced in the direction of rotation of the rotor 8. A tubular projection 18 at the bottom of the body 1 defines an outflow channel communicating with the rotor 8 through an opening 19 in the liner 2. The channel defined through the opening 19 is centered intermediately of the elements 14 and in this instance co-axial with the central vertical axis of the body 1.

The inner surface of each end plate 4 is formed with a cylindrical projection 20 about its central aperture 5. The external dimension of the projection 20 is generally uniform to a plane adjacent its projected extremity where it is reduced to provide a shoulder 21 and then further conically reduced to its projected extremity. The projected extremity of the projection 20 is provided with an internal flange 22 serving to confine the innermost ends of packing elements 6 about the shaft 7.

The end plates 4 are so positioned and formed that the conically reduced ends of their projections 20 are respectively nested in spaced relation to the exteriorly dished surface of the adjacent end wall 11 of the rotor 8 and define an annular chamber 23 therewith between the shaft 7 and the inner peripheral surface of a ring 14. The cylindrical portions of the projections 20 adjacent their projected extremities respectively nest concentrically within the adjacent ring 14, in closely spaced relation thereto, whereby to define an annular orifice 24 providing the outlet from the chamber 23. A further annular chamber 25 is defined about the cylindrical portion of the projection 20 immediately adjacent the inner face of each plate 4, between such inner face and the opposite adjacent end faces of a ring 14 and shoulder 3, limited by the expanded interior end portion of the body 1 concentric therewith.

Thus, radially spaced chambers 23 and 25 are provided to either end of rotor 8 separated by orifices 24. These chambers communicate through parallel tubular passages 26 and 27 in the vanes 10, as shown in FIG. 2 of the drawings and for purposes to be further described. Each chamber 25 has an outlet 28 at its lowest extremity which is directed through the body 1 to communicate with the outflow channel through the tubular projection 18. In addition, passages 29 are defined in each of the plates 4 opening to the respective chambers 23 at their upper extremities for delivery of steam thereto as and for purposes to be further described.

End bells 30 fixed over the outermost faces of the plates 4 complete the valve housing structure and provide further bearings for the shaft 7. Suitable drive means may be provided for the shaft 7, however, such drive means will not be detailed since they form no pertinent part of the present invention. In addition, collars 51 about the shaft 7 confine the outermost ends of the packing elements 6 to the flanges 22.

FIG. 1 of the drawings shows a clockwise drive of the rotor 8. In operation, the vanes 10 will move across the discharge outlet 19 successively from one side portion 31 to an opposite side 32 thereof. The outlet 19 is expanded at the side 32 by a generally rectangular notch 33 in the liner 2. The interior wall of the channel defining structure 18 is provided with a recess 34, located immediately under and open at its top to and coextensive with the notch 33. The recess 34 is generally triangular in outline and has a rounded apex 35 which is lowermost with reference to the rotor 8. An aperture 36 in the wall of member 18 opens into the recess 34 at its apex 35. A baffle plate 37 is fixed to the interior wall of the member 18 to overlie the recess 34 and define an expanding or fan shaped discharge channel therewith leading from the aperture 36 and opening through the notch 33 to the interior of the liner 2. A conduit 52 is connected to deliver steam under pressure through aperture 36 to the recess 34 to be guided and deflected by plate 37 upwardly to the interior of the valve body through the notch 33 in a manner and for purposes to be further described.

Positioned substantially 90° beyond the outlet 19, in the direction of the inlet 17 is an aperture 38 which affords a vent through the liner 2 positioned centrally with reference to the end walls 11 of the rotor 8. Noting FIG. 1 of the drawings, the aperture 38 is generally rectangular with the exception that it diverges upwardly toward the discharge end thereof to thereby provide an expanded outlet and immediate expansion of the discharge. The valve body 1 is formed with a vent aperture 40 aligned with and forming an extension of the aperture 38. The vent aperture 40 is outwardly divergent and leads to a vent conduit 41 connected to the valve body 1. The orientation of the vent apertures 38 and 40 is such that the divergent surfaces defining the outlet portion of the aperture 38 is angled to smoothly discharge along the uppermost wall surface of the vent aperture 40.

Positioned intermediately of the input opening and the vent aperture 38, the liner 2 has a further and relatively enlarged vent aperture 39 opening from its interior to an an expanding vent aperture 42 in the valve body 1 leading to a vent conduit 43.

The structure above described provides the essential features of an improved rotary valve unit in accordance with the invention. The improvements and advantages thereof can probably be best understood by a description of its operation as related to its application as an input valve to a conventional digester unit operating under elevated temperature and pressure. For purposes of this disclosure, it is contemplated that fine wood chips, including fluffy sawdust, are to be delivered through the valve illustrated. Any suitable means may be provided to drive the shaft 7 and thereby rotate the rotor 8 in a clockwise direction, considering the orientation viewed in FIG. 1 of the drawings. Adjacent vanes 10 define a pocket 9 which on registering with the inlet aperture 17 will dispose the vanes respectively in positions substantially vertical and immediately beyond the inlet 17. As this pocket 9 is moved past the inlet 17 it will receive and carry a charge of chips and fluffy sawdust material delivered through the channel member 16. As the advance vane of this pocket 9 moves past the side or edge portion 31 of the outlet 19 in the liner 2, the charge in the pocket 9 presents itself for discharge therethrough under conditions dependent on the pressure at the inlet of the digester to which the valve body 1 connects. As the leading vane 10 of this pocket 9 moves to the side 32 of the outlet 19 and past the notch 33, steam under pressure which is available in the conduit 52 and delivered therethrough into the recess 34 will be forced upwardly to move along the surface 12 of the leading vane defining the pocket 9 to scavenge and eject the charge therein under pressure greater than present at the digester inlet physically and violently separating materials tending to adhere to the walls of the pocket. This insures a forced discharge of essentially the complete content of the pocket through channel 18 and into the connected digester. The orientation of the notch 33 and fan shape of recess 34 are such to produce an expanding flow to completely purge the pocket since it provides continuous wash of its base surface and its force may be controlled to insure positive delivery of the pocket contents to the connected digester.

As the vanes 10 defining the pocket 9 which is discharged advance past the outlet 19, they present the pocket to the vent aperture 38. There is vapor pressure in the pocket 9 resulting from the flushing action at the outlet 19 which at this point is vented through the aperture 38 and body aperture 40 to the conduit 41. Such minor particles as remain in the pocket, if any, are vented at the same time, the venting being facilitated by the flared divergence of the outlet portion of the aperture 38. This flare enables a rapid expansion of the vapor immediately on leaving the pocket thereby speeding the vent action. As the pocket 9 presents itself to the second vent 42, a larger opening is here provided to enable a complete relief of residual pressure remaining in the pocket which might otherwise adversely effect subsequent introduction of a further charge to the pocket as it presents itself to the input opening 17. This two stage venting procedure enables an improvement of the valve feeding capabilities, making possible the handling of lighter and more fluffy materials which has not been practical in the past in using a rotary valve. The employment of the staged exhaust enables a positive relief of all residual vapor pressure remaining in the pockets of the rotor after passing the primary exhaust opening and prior to reaching the inlet 17. In prior art valves the residual pocket vapor has been left to be exhausted through the input opening. In such instances it produces a back pressure on the incoming flow of raw material. This will inherently prove detrimental to uniform material flow, particularly fluffy material, as well as producing an untidy operating characteristic. This phase of the invention enables by its increased exhaust efficiency the operation of the rotor at substantially higher speed as well as maximum capacity, particularly in view of the improved pocket purge aforementioned, as a pocket is presented to the outlet 19.

A further improvement provided by the present invention, with respect to the operating efficiency of rotary valves may be seen with reference to its solution of the problem of leakage. Leakage is minimal with the present invention. However, if it occurs, it passes between the inner surface of the liner 2 and the ring elements 14 on the end walls 11 of the rotor. It will be seen that in the instance of the present invention, the leakage to either side of the rotor is to the chambers 25 while the chambers 23 are the recipients of steam vapor delivered under pressure through the passages 29. The chambers 25 and 23, as previously described, are separated by the narrow annular orifice 24. The building up of steam under pressure in the chambers 23 prevents an inflow of the leakage material thereto, the steam under pressure driving through the orifices 24 to scavenge the chambers 25 and discharge the leakage material out of the chambers 25 through the passages 28 leading therefrom to the discharge channel member 18 as may be particularly seen with reference to FIG. 2 of the drawings. Thus, the present invention provides an effective purge system for leakage materials and prevents access of their deteriorating influence to the packing elements 6, for example, enabling an extended operating life therefor in the process.

A further incident in the use of steam under pressure in the chambers 23 is that the apertures or passages 26 and 27 through the rotor vanes 10 are the recipients of this steam. The presence of steam in the passages 26 and 27, which are radially spaced, serves to assure a more uniform temperature of the rotor, thereby minimizing the differential thermal expansion along the rotor diameters as occurs in prior art valve units of the type in question. To emphasize the advantages obtaining by this simple structure, it must be pointed out that with any decrease or change in temperature in any section of a valve unit applied to similar purposes there is contraction of the rotor part which in turn results in increased clearances for vapor leakage. The present structures, by use of the passages 26 and 27 extending through the vane sections, interconnects the end cavities to each other providing an effective and continuous transmission of heat to the vane sections to minimize their thermal contractions, which in the past has caused excessive vapor leakage during operation. An incident of this improvement is the minimization of erosion normally caused by high pressure vapor passing through the clearances caused by vane contraction. A further feature and result is the elimination of any pressure differential between the cavities or chambers, to either end of the rotor which may tend to overload thrust bearings holding the rotor in place. This elimination of differential pressures at the ends of the rotor also minimizes the axial movement effect of the rotor in its seat which in the past could occur because of the differential piston effect at the ends of the rotor. Thus it may be seen the invention provides substantial influence in a rotary valve maintaining a complete balance in operation, thereby minimizing or eliminating heavy maintenance and replacement requirements normally incident to its operation.

In the conventional rotary valve unit employed for similar purposes, having a vertical alignment of the inflow and outflow channels, there is an inherent back pressure angularly directed through the rotor due to unbalance pocket pressures producing a bending force. This is inherent in the valve units as normally provided and results in wear on the interior of the valve body and on the vanes, particularly in the area of the inflow opening. The present invention by the relative offset of the inflow and outflow openings affords a support and backing for the rotor at its vertical limit accommodating the components of the resultant unbalance pressure, thereby relieving the shaft and minimizing the pressure effects incident to the pressure differential existing in operation.

Thus, the present invention lends many features of improvement to material handling valves, and particularly to rotary valves, enabling a highly advantageous application thereof to vessels operating under elevated temperatures and pressures. The invention has been very simply effected but the significance thereof and its various aspects will not be lost on those versed in the art. In summary, the invention produces valve units providing a more balanced rotor operation, a more complete and more positive delivery of materials handled, independent of material size, shape or weight, an improved and more effective venting system enabling maximum capacity in use, a positive purge system for disposing of leakage particles, whereby to preserve operating and bearing components as well as prolonging their operating life, and in addition provides a temperature equalizing system for the rotor per se which assist in providing a more effective and efficient operating efficiency therefor.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A rotary valve unit including a valve housing having an input and a discharge opening therein, a rotor journaled in said valve housing, in bearing relation thereto, having means defining pockets therein adapted to successively communicate with said input and discharge openings and carry materials therebetween, means defining an expanding orifice in said housing at said discharge opening arranged to deliver an expanding flushing flow of fluid to move over the walls of said pockets as they successively communicate with said discharge opening to effect a substantially complete scavenging of the materials from said pockets and a pressured delivery thereof through said discharge opening, said means including deflector means to spread the flow in a flat wide stream over the walls of said pockets.

2. A material handling valve unit including a valve housing having input and discharge openings therein, a rotor journaled in said housing, in bearing relation thereto, having means defining pockets expanding outwardly thereof arranged to successively communicate with said input and discharge openings on rotation of said rotor, means defining a lateral expansion of said discharge opening at one side thereof, an orifice formed in said housing to communicate with the laterally expanding portion of said discharge opening to provide for delivery thereto of fluid under pressure and baffle means arranged in the path of fluid flowing from said orifice to cause the fluid to flow immediately over the base walls of said pockets to effect a pressured delivery of materials therein through said discharge opening on registration thereof with the laterally expanding portion of said discharge opening.

3. A material handling valve unit including means defining a valve body open to opposite ends and having intermediate its ends inlet and outlet means for the handled material, closure means for said opposite ends, a drive shaft bearing in said end closure means and extending through said valve body, a rotor on said drive shaft journaled in said valve body rotatably to convey material from said inlet means to said outlet means, walls on said rotor defining chambers to either end thereof, means for delivery of fluid under pressure to at least one of said chambers, passages through said rotor for communicating said chambers to provide for fluid flow therebetween in a manner to maintain essentially uniform temperature throughout the expanse of said rotor in operation, and an outlet from said unit for the introduced fluid.

4. A material handling valve consisting of a valve housing, a vaned rotor journalled for rotation in said valve housing, in bearing relation thereto, the vanes of said rotor defining circumferentially spaced pockets, inlet and discharge openings in said housing arranged for successive communication with each of said pockets during rotation of said rotor, said inlet and outlet openings being slightly offset from a direct axial alignment, means forming a flat expanding channel in the discharge opening of said valve housing for delivery of an expanding sheet-like flow of fluid to mover over the wall of each of said pockets, from one side thereof to the other, as said pockets achieve a full exposure to said discharge opening, whereby to effect a substantially complete scavenging of the material in said pockets from the walls thereof and a pressured delivery of such material through said discharge opening and staged vent means arranged in said housing intermediate said discharge and inlet openings for communicating with and sequentially relieving the pressure remaining in each said pocket subsequent to material discharge, enabling thereby a complete charge of material to be delivered to each of said pockets at said inlet opening.

5. In a rotary valve unit, means defining a valve body open to opposite ends, closure means for said opposite ends, a drive shaft bearing in said end closure means and extending through said valve body, a vaned rotor on said drive shaft journaled in said valve body, end walls on said rotor bearingly related to the inner wall of said valve body, means defining an inflow channel through said valve body to open to said rotor between the end walls thereof, means defining an outflow channel in said valve body communicating with said rotor between the end walls thereof, the external faces of said end walls of said rotor and the respectively adjacent surfaces of said end closure means being so formed to provide radially spaced chambers to either end of said rotor separated by annular orifices and means connected to the inner of said radially spaced chambers for establishing a pressured flow of fluid therethrough to scavenge the outer of said radially spaced chambers and means defining outlets from the outer of said radially spaced chambers to provide for delivery of scavenged materials therethrough.

6. A material handling valve including, a valve body, a rotor journalled in said body, in bearing relation thereto, said body having an inlet and an outlet, said rotor having at least one pocket adapted to successively register with said inlet to receive a charge and move to said outlet and means on the far side of said outlet, in respect to the direction of rotation of said rotor, defining a fluid discharge channel including deflector portions arranged, on full registration of said pocket with the outlet, to produce a fan shape flow of fluid which scavanges the wall surface of said pocket, from one side to the other, whereby to purge said pocket on movement thereof past said outlet.

7. A material handling valve including a valve body having an inlet and an outlet, a rotor bearing in said valve body having pocket means at its periphery successively opening to said inlet and said outlet, means connected with said valve body and rotor forming radially spaced chambers to either end of said rotor separated by limited passageways, the outer of said chambers having discharge openings and means for directing a pressured flow of scavenging fluid to the inner chambers to move through said limited passageways in a manner to prevent inflow to said inner chambers from said outer chambers and to scavenge said outer chambers and exit through said discharge openings.

8. A material handling valve including a valve body having an inlet and an outlet, a rotor bearing in said valve body having pocket means at its periphery sucessively opening to said inlet and said outlet, means connected with said valve body and rotor forming chambers to either end of said rotor having discharge openings at their outer peripheries, means for directing a pressured flow of scavenging fluid to move from the inner peripheries of said chambers to flow to their outer peripheries and through said discharge openings, said rotor pocket means being defined laterally by radial vanes, channels in said vanes respectively communicating with said chambers to either end of said rotor for flow of the scavenging fluid therethrough from one chamber to the other whereby to subject said rotor to temperature control.

9. A material handling valve unit including means defining a valve body open to opposite ends, closure means for said opposite ends, a drive shaft bearing in said end closure means and extending through said valve body, a rotor on said drive shaft journaled in said valve body, end walls on said rotor respectively defining a chamber to either end with one of said closure means, means for delivery of fluid under pressure to said chambers and means providing for reciprocal fluid flow through said rotor from one chamber to the other for control of the rotor temperature during its operation.

10. A material handling valve unit including means defining a valve body including an inlet opening and, circumferentially spaced therefrom, an outlet opening, a rotor journalled for rotation in said valve body including pockets arranged to successively communicate with said inlet and outlet openings, means defining chambers respectively exterior to either end of said rotor within said valve body, and means for delivery of fluid under pressure to said chambers, said rotor having through passages intermediate said pockets which communicate said chambers and provide for reciprocal fluid flow therebetween which controls the rotor temperature.

11. A rotary valve unit consisting of a valve housing, rotor means journaled for rotation in said housing including end walls in bearing relation thereto, the housing having an inlet and a discharge opening, means defining spaced pockets in said rotors for successive communication with said openings, said housing including means defining radially spaced chambers to either end of said rotor separated by an annular passage, means for delivering fluid under pressure to the inner of said chambers to either end of said rotor to prevent leakage thereto from the outer of said chambers and to move through said annular orifice to scavenge the outer of said chambers, and means defining openings from the outer of said chambers in communication with the discharge opening from said valve housing.

12. The structure as set forth in claim 11 and means defining passages through said rotor for flow of fluid from one of said chambers to another whereby to control the temperature of said rotor.

13. A rotary valve unit for conducting material between differential pressure areas, including a rotor comprising a shaft and longitudinal spaced generally radially projecting walls intermediately disposed thereon defining a circular series of pockets, housing means in surrounding relation to said rotor providing a bearing for said shaft and inlet and outlet openings for material communicating with said pockets in response to rotation of said rotor, overlapping parts on said housing means and respective walls defining first chamber means to either end of said intermediately disposed walls adjacent said shaft and further defining second chamber means radially outward of said first chamber means, said overlapping parts providing for restricted orifice-like communication between said first and second chamber means, means for supplying said first chamber means with fluid under pressure, and means for relatively venting said second chamber means.

14. A rotary valve unit according to claim 13 wherein said pockets are separated by vanes transversely disposed between said walls, characterized by passages in said vanes intercommunicating said first and second chamber means.

15. A rotary valve unit according to claim 13, characterized in that at least one of the overlapping parts on said housing means and said rotor is elongated whereby to maintain an orifice relationship between said parts despite limited axial motion of the rotor relative to said housing means.

16. A rotary valve unit for conducting material between differential pressure areas, including a body having a through longitudinal opening and circumferentially offset lateral openings, one of the latter being a material inlet and the other a material outlet, a rotor longitudinally disposed in said body and having an intermediately disposed radially projected pocket portion bearingly related at its periphery to said body and traversing said lateral openings in response to rotation of said rotor, said rotor further comprising a shaft, end closures for the longitudinal through opening in said body, said shaft having a rotary bearing in said end closure, the pocket portion of said rotor and said end closures being formed with longitudinally projected shoulders received one within the other to define an orifice area of relatively low clearance therebetween, there being chambers radially inward and outward of said low clearance area respectively adjacent said shaft and the periphery of said pocket portion, means for admitting fluid under pressure to said inward chamber.

17. A rotary valve unit including, a valve housing, a rotor longitudinally disposed for relative rotary motion in said housing, said rotor having longitudinally spaced apart radially projected walls, transverse rotor vanes defining circumferentially spaced pockets between said walls, said housing having material inlet and outlet openings traversed by said pockets in response to rotation of said rotor, means defining chambers in said housing to either end of said rotor walls, means in connection with said chambers providing for an introduction thereto of fluid under pressure, further means providing for discharge of the fluid from said chambers, means imposing a fluid pressure drop in said chambers between said fluid introduction and discharge means and passages in said vanes which communicate said chambers.

References Cited by the Examiner

UNITED STATES PATENTS

| | | |
|---|---|---|
| 1,524,270 | 1/1925 | Miller. |
| 1,609,401 | 12/1926 | Crites et al. |
| 2,489,925 | 11/1949 | Omwake. |
| 2,585,472 | 2/1952 | Kennedy. |
| 2,750,233 | 6/1956 | Yellott _____ 302—49 |
| 2,766,911 | 10/1956 | Greaves _____ 222—194 |
| 2,858,212 | 10/1958 | Durant et al. |
| 2,907,499 | 10/1959 | Agronin _____ 222—194 |
| 2,921,721 | 1/1960 | Brooks _____ 222—194 |
| 2,933,208 | 4/1960 | Green. |
| 2,938,752 | 5/1960 | Atkinson et al. |
| 2,960,245 | 11/1960 | Knapp. |
| 3,005,317 | 10/1961 | Bunn _____ 302—53 |
| 3,009,744 | 11/1961 | Lenhart _____ 302—49 |

FOREIGN PATENTS

| | | |
|---|---|---|
| 597,492 | 5/1934 | Germany. |
| 698,214 | 11/1940 | Germany. |
| 695,382 | 8/1953 | Great Britain. |

SAMUEL F. COLEMAN, *Primary Examiner.*

ANDRES H. NIELSEN, ERNEST A. FALLER, WILLIAM B. LA BORDE, *Examiners.*